United States Patent
Kariya et al.

(10) Patent No.: US 6,465,133 B1
(45) Date of Patent: Oct. 15, 2002

(54) METALLIC POROUS BODY AND METHOD OF MANUFACTURING THE SAME AND BATTERY CURRENT COLLECTOR HAVING THE SAME

(75) Inventors: Ayao Kariya, Shinminato; Noriki Hayashi, Osaka; Shinji Inazawa, Osaka; Masatoshi Majima, Osaka, all of (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/567,014

(22) Filed: May 9, 2000

(30) Foreign Application Priority Data

May 26, 1999 (JP) .......................................... 11-147154

(51) Int. Cl.[7] .......................... H01M 4/80; H01M 6/02; H01M 4/29; B22F 3/10; B32B 5/18
(52) U.S. Cl. ...................... 429/235; 429/236; 428/550; 428/560; 205/59; 205/60
(58) Field of Search ................................ 429/233, 235, 429/236; 428/550, 566; 205/60, 59

(56) References Cited

U.S. PATENT DOCUMENTS 4,793,968 A * 12/1988 Mosser et al. .............. 428/550
5,681,673 A * 10/1997 Hattori et al. .............. 429/235
5,928,810 A *  7/1999 Bernard et al. ............. 429/235
6,117,592 A *  9/2000 Hoshino et al. ............ 429/235
6,379,845 B1 *  4/2002 Inazawa et al. ............ 429/235

* cited by examiner

Primary Examiner—Stephen Kalafut
Assistant Examiner—Julian A. Mercado
(74) Attorney, Agent, or Firm—McDermott, Will & Emery

(57) ABSTRACT

A metallic porous body comprises a metallic framework having a three-dimensional network with a continuous-pore structure formed by linking sub-stantially polyhedral cells. The substantially polyhedral cells have an average cell diameter of about 200 to about 300 $\mu$m and an average window diameter of about 100 to about 200 $\mu$m. The metallic porous body can be obtained by the following method, for instance: First, a plastic porous body is provided that has an average cell diameter of about 200 to about 300 $\mu$m and an average window diameter of about 100 to about 200 $\mu$m. Second, a conductive layer is formed on a surface of the framework of the plastic porous body to produce a conductive porous body having a resistivity of about 1 k$\Omega$·cm or less. Finally, a continuous metal-plated layer is formed on a surface of the conductive layer by electroplating, with the conductive porous body serving as the cathode. The above-mentioned current collector is provided by filling an active material into the pores of the metallic porous body.

9 Claims, 2 Drawing Sheets

W : Window diameter
C : Cell diameter

W : Window diameter

C : Cell diameter

METALLIC POROUS BODY AND METHOD OF MANUFACTURING THE SAME AND BATTERY CURRENT COLLECTOR HAVING THE SAME

BACKGROUND OF THE INVENTION

1. Field of the Invention

The present invention relates to a metallic porous body comprising a metallic framework for alkaline batteries, such as a nickel-cadmium battery, a nickel-hydrogen battery, and a nickel-zinc battery; a method for manufacturing the metallic porous body; and a current collector having the metallic porous body.

2. Description of the Background Art

Sponge-like metals and sintered metals have been widely used as the current collector for alkaline batteries. Sponge-like metals comprise a metallic framework having a three-dimensional network with a continuous-pore structure formed by linking sub-stantially polyhedral cells. Because they have a porosity as high as about 90 to about 98%, they can increase the filling amount of an active material per unit volume, offering a current collector having high capacity density (mAh/cc) as an advantageous feature.

Sintered metals have a porosity no more than about 85%, which is inferior to sponge-like metals. However, sintered metals have pore diameters as small as several micrometers, allowing a large current to flow. As a result, they can offer a high-output current collector as an advantageous feature.

Development of new technologies such as hybrid electric cars has been strongly required in recent years to cope with environmental problems and energy problems. Batteries for such electric cars need a high-output current collector having, for instance, a sintered metal.

However, it is difficult to fill an active material into sintered metals by the paste method. Consequently, the reduced-pressure impregnation method must be applied repeatedly. This means that filling of the active material must be carried out by batch processing rather than by continuous processing, posing a problem of filling-cost increase.

In order to overcome this drawback in sintered metals, an idea has been pro-posed to offer a current collector that is suitable for high-power use in which a large current must be allowed to flow. The idea is to reduce the diameter of substantially polyhedral cells in a sponge-like metal without losing the sponge-like metal's advantages of high porosity and high capacity density.

However, a reduction in the diameter of the substantially polyhedral cells by conventional techniques entails a concurrent reduction in the size of the windows of internally existing cells that can be seen through the opening of the substantially polyhedral cells on a surface of the sponge-like metal.

This reduction in the size of the windows has posed problems in that the windows are easily clogged in the filling process of an active material and that it is difficult to fill an active material uniformly into the sponge-like metal. These problems have caused serious problems of cracking in the subsequent rolling process and a reduction in the final battery capacity.

SUMMARY OF THE INVENTION

An object of the present invention is to offer a metallic porous body that maintains high capacity density, that is free from clogging in the filling process of an active material, that allows the active material to fill the body uniformly even into the deep inside, and that thereby allows a large current to flow; and to offer a method of manufacturing the metallic porous body.

Another object of the present invention is to offer a current collector for batteries having a high output and large battery capacity.

After intensive studies to solve the above-described problems, the present inventors found that when the "cell diameter" and "window diameter" in a sponge-like metal are controlled to fall within their respective specified ranges, a high output can be obtained without losing the sponge-like metals advantages of high porosity and high capacity density, and completed the present invention.

In the present invention, the terms "cell diameter" and "window diameter" are defined as follows when used in relation with a metallic porous body, such as a sponge-like metal, or a plastic porous body with a framework, where the metallic porous body and plastic porous body have a continuous-pore structure formed by linking substantially polyhedral cells: "cell diameter": the longest diagonal of the substantially polygonal opening of a substantially polyhedral cell on a surface of a metallic or plastic porous body (see FIG. 1), and "window diameter": the longest diagonal of the substantially polygonal window of an internally existing, substantially polyhedral cell that can be seen through the above-mentioned opening of another substantially polyhedral cell on a surface of a metallic or plastic porous body (usually, a plurality of such windows can be seen through an opening)(see FIG. 1).

The metallic porous body of the present invention comprises a metallic framework having a three-dimensional network with a continuous-pore structure formed by linking substantially polyhedral cells. The substantially polyhedral cells have an average cell diameter of about 200 to about 300 $\mu$m and an average window diameter of about 100 to about 200 $\mu$m.

The metallic porous body of the present invention is suitable for a high-power current collector that allows a large current to flow, because the metallic porous body has a small average cell diameter.

In addition, the metallic porous body of the present invention has a larger average window diameter than conventional metallic porous bodies that have a similar average cell diameter. Consequently, the metallic porous body of the present invention can be filled with an active material uniformly with high density, enabling a further increase in the battery capacity without losing the sponge-like metals advantages of high porosity and high capacity density.

The metallic porous body of the present invention can be obtained by the following methods, for instance:

(a) First, a plastic porous body is provided that has an average cell diameter of about 200 to about 300 $\mu$m and an average window diameter of about 100 to about 200 $\mu$m. Second, a conductive layer is formed on a surface of the framework of the plastic porous body by electroless plating to produce a conductive porous body having a resistivity of about 1 k$\Omega$·cm or less. Finally, a continuous metalplated layer is formed on a surface of the conductive layer by electroplating, with the conductive porous body serving as the cathode. (b) First, a plastic porous body is provided that has an average cell diameter of about 200 to about 300 $\mu$m and an average window diameter of about 100 to about 200 $\mu$m. Second, a conductive layer is formed on a surface of the framework of the plastic porous body by applying a solution of binder resin containing a carbon powder to produce a conductive porous body having a resistivity of about 5 kΩ·cm or less. Finally, a continuous metal-plated layer is formed on a surface of the conductive layer by electroplating, with the conductive porous body serving as the cathode.

It is desirable to remove the plastic porous body by heat treatment after the metal-plated layer is formed.

In the present invention, an electrical resistance for calculating the foregoing resistivity is measured by the configuration shown in FIG. 2. A conductive porous body 1 with a size of 10×150 mm is provided as a test sample. Two potential terminals 2A and 2B are placed 100 mm apart on the sample. Two current terminals 3A and 3B are placed outside the potential terminals as shown in FIG. 2. A potentiometer 4 is connected to the potential terminals to measure the potential drop when a current of 1A is injected through the current terminals. A reading is usually taken 1 to 5 seconds after the current injection. A total weight of 516.83 g is applied to the sample by the four terminals.

The manufacturing method (a) above is advantageous because it can further reduce the resistivity of the conductive layer, and it facilitates the formation of a continuous, uniform metal-plated layer in the electroplating process.

The first method for manufacturing the metallic porous body of the present invention is as follows: First, a conductive layer is formed on a surface of the framework of a plastic porous body by electroless plating to produce a conductive porous body having a resistivity of about 1 kΩ·cm or less. Then, a continuous metal-plated layer is formed on a surface of the conductive layer by electroplating, with the conductive porous body serving as the cathode.

The first method can further reduce the resistivity of the conductive layer. It is preferable, and still possible, to reduce it as low as about 100Ω·cm or less. Such a method enables the formation of a metal-plated layer with uniform thickness in the thickness direction of the plastic porous body, even with an extremely fine structure of the metallic porous body of the present invention.

The second method for manufacturing the metallic porous body of the present invention is as follows: First, a conductive layer is formed on a surface of the framework of a plastic porous body by applying a solution of binder resin containing a carbon powder to produce a conductive porous body having a resistivity of about 5 kΩ·cm or less. Then, a continuous metal-plated layer is formed on a surface of the conductive layer by electroplating, with the conductive porous body serving as the cathode.

The second method can form an extremely fine structure of the metallic porous body of the present invention by a simple method such as to apply a solution of binder resin containing a carbon powder, enabling a reduction in the manufacturing cost.

The battery-use current collector of the present invention specifically has the metallic porous body of the present invention.

The battery current collector of the present invention has a metallic porous body that not only can increase the battery capacity but also enables the dense, uniform filling of an active material. Therefore, the current collector is suitable for use in batteries that need to have a high output and large capacity, such as those used in electric cars.

As described above, the present invention offers a metallic porous body that enables the dense, uniform filling of an active material without decreasing large battery capacity, which is an important feature of a metallic porous body such as a sponge-like metal. Such a metallic porous body can offer a current collector having large capacity and a high output.

DESCRIPTION OF THE PREFERRED EMBODIMENTS

Metallic Porous Body

Figure 1:
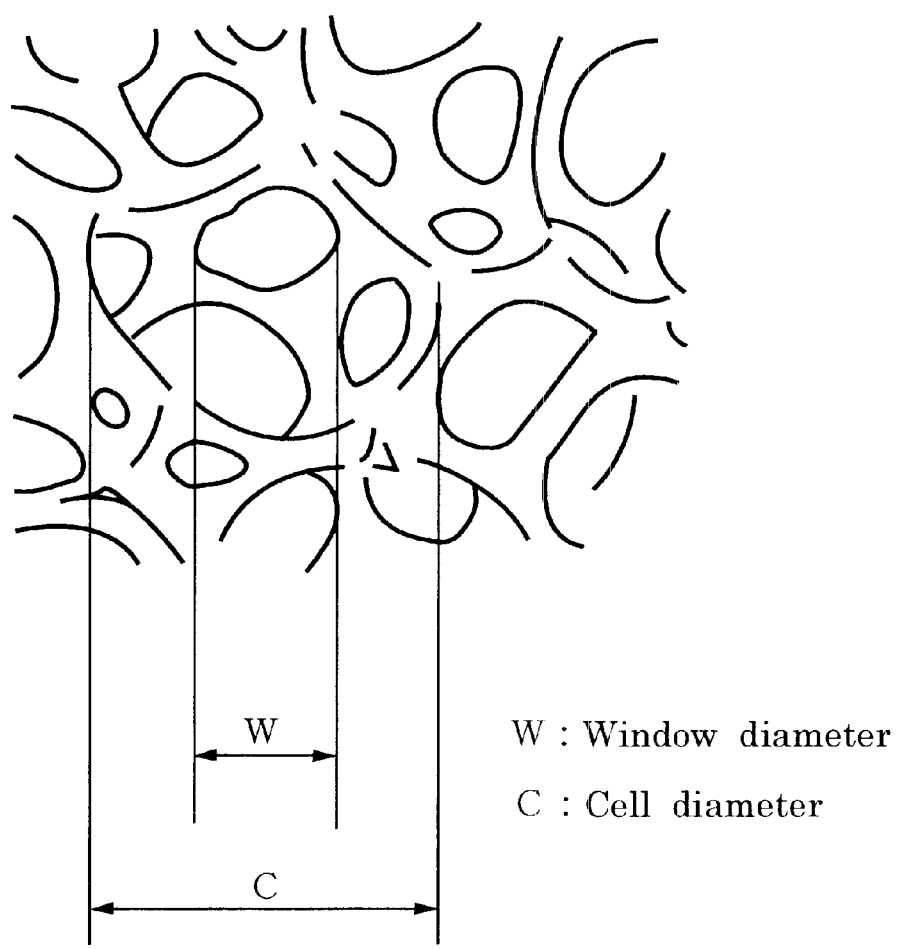
FIG. 1 shows a framework structure of the metallic porous body of the present invention taken through a scanning electron microscope (SEM) at 50 power.
Figure 2:
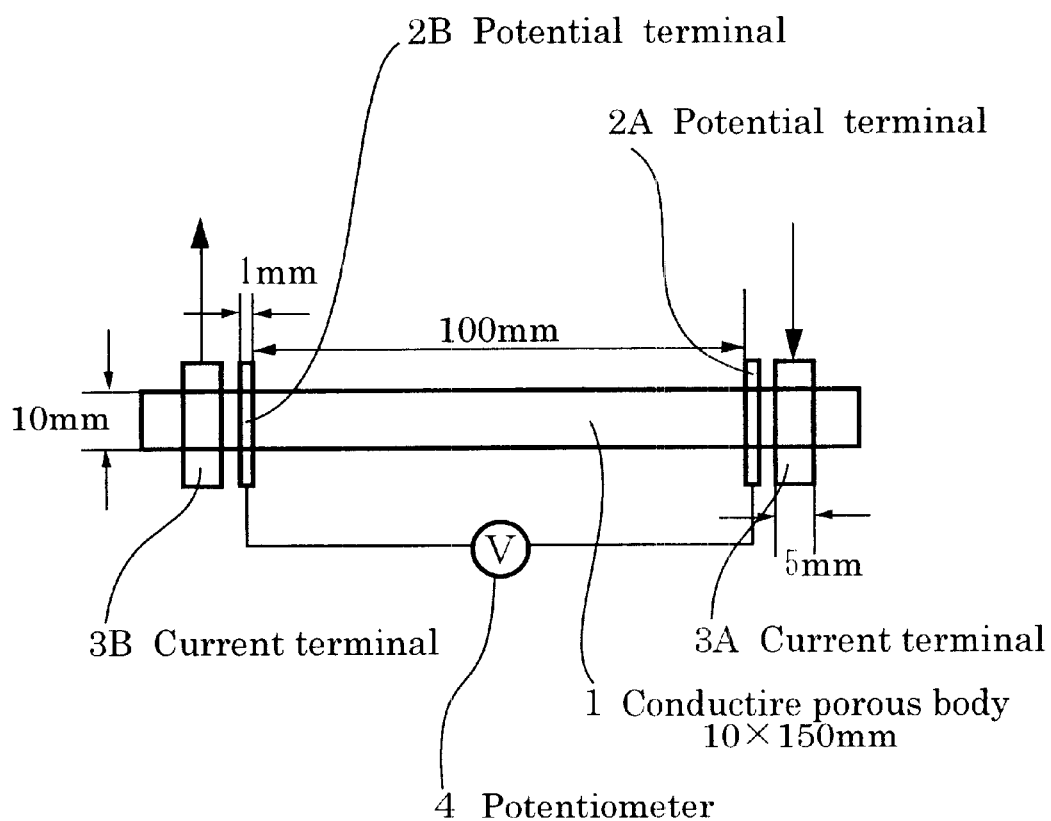
FIG. 2 is a schematic diagram showing a configuration for measuring an lectrical resistance of a conductive porous body of the present invention.

First, a detailed explanation is given to the metallic porous body of the present invention.

As described above, the metallic porous body of the present invention specifically comprises a metallic framework having a three-dimensional network with a continuous-pore structure formed by linking substantially polyhedral cells.

The metallic framework having a three-dimensional network structure comprises various metals commonly used in conventional metallic porous bodies, such as nickel, nickel-chrome alloy, and nickel-chrome-aluminum alloy. Of these, nickel is desirable in obtaining a metallic porous body for manufacturing a high-output, large-capacity battery.

The metallic porous body of the present invention has a controlled average value of cell diameters that falls in the range of about 200 to about 300 µm.

If the average value is less than about 200 µm, clogging cannot be suppressed in the filling process of an active material, even when the window diameter is increased. On the contrary, if the average value exceeds about 350 µm, a metallic porous body cannot be obtained that is suitable for manufacturing a high-output battery.

It is preferable that the average cell diameter be controlled to fall in the range of about 250 to about 300 µm.

The metallic porous body of the present invention has an average window diameter that is controlled to fall in the range of about 100 to about 200 µm.

If the average value is less than about 100 µm, clogging cannot be suppressed in the filling process of an active material. On the contrary, if the average value exceeds about 200 µm, a problem is posed in that the metallic porous body allows the filled active material to flow out easily.

It is preferable that the average window diameter be controlled to fall in the range of about 100 to about 150 µm.

The porosity of the metallic porous body has no special limitations. However, it is desirable to have large porosity in order to increase the filling amount of the active material per unit volume so that the battery can have further increased capacity. Consequently, the porosity is controlled to fall usually in the range of about 90 to about 99%, desirably in the range of about 98 to about 99%.

If the porosity falls short of the foregoing range, the amount of the active material to be held in the pores of the continuous-pore structure decreases, so that a large-capacity battery may not be obtained. On the contrary, if the porosity exceeds the foregoing range, the strength of the metallic porous body decreases, so that the metallic porous body may not be used as a member such as an electrode substrate.

Method for Manufacturing Metallic Porous Body

The metallic porous body of the present invention is manufactured by either of the following methods:

(a) First, the surface of the framework of a plastic porous body is treated with a catalyst such as palladium chloride. Second, a conductive layer is formed on the treated surface by electroless plating such as electroless nickel plating to produce a conductive porous body having a resistivity of about 1 k$\Omega$·cm or less. Finally, a continuous metal-plated layer is formed on a surface of the condutive layer by electroplating.

(b) First, a solution of binder resin containing a carbon powder such as a graphite powder is applied to the surface of the framework of a plastic porous body. Second, a conductive layer is formed by drying the solution to produce a conductive porous body having a resistivity of about 5 k$\Omega$·cm or less. Finally, a continuous metal-plated layer is formed on a surface of the conductive layer by electroplating.

In the method (a) above, the conductive porous body having a resistivity of about 1 k$\Omega$·cm or less can be obtained by controlling the amount of metal to be deposited by electroless plating. With the electroless nickel plating, for instance, the amount of metal deposited by the plating is controlled to about 5 g/m$^2$ or more, desirably within the range of about 5 to about 10 g/m$^2$.

In the method (b) above, the conductive porous body having a resistivity of about 5 k$\Omega$·cm or less can be obtained by controlling the amount of carbon powder to be deposited onto the surface of the framework of the plastic porous body.

In the method (a) above, where the conductive layer is formed by electroless plating, if the conductive porous body has a resistivity higher than about 1 k$\Omega$·cm, a uniformly electroplated layer cannot be formed on a surface of the conductive layer. Analogously, in the method (b) above, where the conductive layer is formed by applying a solution of binder resin containing a carbon powder, if the conductive porous body has a resistivity higher than about 5 k$\Omega$·cm, a uniformly electroplated layer cannot be formed on a surface of the conductive layer.

Plastic Porous Body

The foregoing plastic porous body can be any porous body that has a continuous-pore structure formed with a synthetic resin. Therefore, various types of well-known plastic porous bodies that have been employed as a core can be used for producing a metallic porous body.

These types include foamed bodies having a three-dimensional network with a continuous-pore structure throughout the body and nonwoven or woven fabrics made of plastic fibers.

More specifically, the foamed bodies include a polyurethane foam and other foamed bodies made of thermoplastic resins such as polystyrene, polyethylene, polypropylene, and polyvinyl chloride. Similarly, the plastic fibers constituting the nonwoven or woven fabrics include various well-known plastic fibers such as polyethylene, polyester, polypropylene, and nylon fibers.

In order to manufacture the metallic porous body that has the specified average cell diameter and the specified average window diameter of the present invention, it is desirable that the plastic porous body to be used as the core for manufacturing the metallic porous body have a controlled average cell diameter and a controlled average window diameter that fall within the respective specified ranges.

More specifically, the average value of cell diameters and the average window diameter of the plastic porous body can be controlled to values similar to those in the final metallic porous body, because the thickness of the conductive layer and the metal-plated layer formed on a surface of the framework has no significant effect on the plastic porous body.

In other words, it is desirable that the plastic porous body have an average cell diameter of about 200 to about 300 $\mu$m and an average window diameter of about 100 to about 200 $\mu$m.

If the average cell diameter and the average window diameter fall beyond the foregoing ranges, the average cell diameter and the average window diameter of the final metallic porous body may not be controlled to fall within the respective specified ranges.

The plastic porous body is usually removed by heat treatment after the conductive layer and the metal-plated layer are formed successively on a surface of the framework. This removal gives the advantage of the reduction in weight of the metallic porous body.

When a metallic porous body is used as a plate for an alkaline secondary battery without removing the plastic porous body by heat treatment, the plastic porous body is required to have excellent alkali resistance because it must have excellent resistance to an extreme alkali of the alkaline electrolyte. In this case, therefore, it is desirable to use a polyolefin such as polyethylene and polypropylene among those materials previously described for forming the porous body.

On the other hand, when a plastic porous body is removed by the aforementioned heat treatment or when a metallic porous body is used as a plate for a battery other than alkaline secondary batteries, the plastic need not have resistance to alkalies. In this case, therefore, it is desirable to use a general-purpose porous body such as a polyurethane foam in terms of easy removal by heat treatment and low manufacturing costs.

Conductive Layer

A conductive layer is formed on a surface of the framework of the plastic porous body by the following methods, for example:

(a) The surface of the framework of the plastic porous body is first treated with a catalyst such as palladium chloride and then plated by electroless plating such as electroless nickel plating.

(b) A solution of binder resin containing a carbon powder such as a graphite powder is applied onto the surface of the framework of the plastic porous body and then dried.

When a conductive layer comprises a metal layer of nickel formed by the electroless nickel plating described in the method (a) above, a metallic porous body with a single, metallic layer can be obtained by the electroplating process described below.

A metal-plated layer formed by the electroplating process described below need only have a surface formed of a required metal as an electrode substrate. Accordingly, the conductive layer as the substrate for the metal-plated layer can be either a metallic layer that is lower in cost and easier in forming or a layer of binder resin containing a carbon powder mentioned before.

A conductive layer has no special limitations on the thickness. It has only to have a thickness sufficient for forming a uniform, continuous metal-plated layer in the electroplating process described below.

In order to obtain a uniform, continuous metal-plated layer, a conductive porous body having a conductive layer formed on a surface of the framework of the plastic porous body is controlled to have a resistivity of about 5 kΩ·cm or less, desirably about 1 kΩ·cm or less.

If the resistivity exceeds about 5 kΩ·cm, the metal-plated layer formed on a surface of the conductive layer may lose uniformity in the thickness and/or continuity.

Metal-Plated Layer

As mentioned previously, a metal-plated layer formed on a surface of the framework of the conductive porous body has only to be formed of a metal needed as an electrode substrate. Nickel is one such metal.

The metal-plated layer has no special limitations on the thickness. Nevertheless, considering its strength and the resistivity and porosity of the metallic porous body, it is The core was processed through the following steps to obtain a conductive porous body having a coated nickel layer of an amount 10 g/m$^2$:

(1) degreasing process (2) water-washing process (3) sensitizing process (4) activating process (5) water-washing process (6) electroless nickel-plating process The chemicals used and the processing conditions employed in the processes (1) to (6) above are shown in Table 1.

TABLE 1

| No | Process | Chemicals | Concentration | Processing temperature (° C.) | Processing time (Min) |
|---|---|---|---|---|---|
| 1 | Degreasing | Alkaline degreasing agent* | 100 g/l | 50 | 10 |
| 2 | Water-washing | — | — | — | — |
| 3 | Sensitizing | 1) Tin chloride | 30 ml/l | 25 | 5 |
|   |   | 2) Concentrated hydrochloric acid | 40 g/l |   |   |
| 4 | Activating | 1) Palladium chloride | 5 g/l | 25 | 5 |
|   |   | 2) Concentrated hydrochloric acid | 30 ml/l |   |   |
| 5 | Water-washing | — | — | — | — |
| 6 | Electroless nickel plating | 1) Nickel sulfate | 30 ml/l | 40 | 5 |
|   |   | 2) Sodium hypophosphite | 10 ml/l |   |   |
|   |   | 3) Ammonium chloride | 50 ml/l |   |   |
|   |   | 4) Sodium citrate | 80 ml/l |   |   |

*: Manufacturer: Okuno Chemical Ind. Co., Ltd., Brand name: Ace clean desirable that the metal-plated layer have a thickness of about 5 to about 30 μm or so, preferably about 5 to about 10 μm or so.

Current Collector

The current collector of the present invention is provided by filling an active material into the pores of the metallic porous body of the present invention. The active material for this purpose is selected in accordance with the type of battery and the polarity of the plate to which the current collector is applied.

When the current collector of the present invention is used as the nickel electrode of a battery such as a nickel-cadmium battery, a nickel-hydrogen battery, or a nickel-zinc battery, an active material such as nickel hydroxide is used. The current collector of the present invention can also be used as a cadmium electrode or a hydrogen electrode as the negative electrode by using an active material such as cadmium or hydrogen-absorbing alloy.

EXAMPLES

The present invention is explained by the examples and comparative examples below.

Example 1

A polyurethane foam having a thickness of 1.0 mm was used as the core. The foam has a continuous-pore structure with an average cell diameter of 260 μm and an average window diameter of 110 μm.

The conductive porous body was electroplated (nickel plating) in a Watts at a current density of 10 A/dm$^2$ for 20 minutes, with the conductive porous body serving as the cathode. The electroplated body was heat-treated in a hydrogen atmosphere at 1,000° C. for 30 minutes to remove the polyurethane-foam core. Thus, a metallic porous body that has a continuous metal layer of formed on a surface of the framework of the conductive porous body was obtained.

Example 2

A coating liquid was prepared by the following method: First, polyvinyl alcohol and phenolic resin were dissolved in alcohol with a weight ratio of 7:3. Then, a graphite powder having an average grain size of 0.8 μm was dispersed in the alcohol solution so as to achieve a concentration of 100 g/liter. The coating liquid thus prepared was applied onto the surface of the framework of the same polyurethane-foam core as used in Example 1 by the dip-coating method. The coated core was dried at 100° C. Thus, a conductive porous body was obtained that has a conductive layer with a coated amount of 50 g/m$^2$.

The conductive porous body was electroplated (nickel plating) in a Watts bath at a current density of 10 A/dm$^2$ for 20 minutes, with the conductive porous body serving as the cathode. The electroplated body was heat-treated in a hydrogen atmosphere at 1,000° C. for 30 minutes to remove the polyurethane-foam core. Thus, a metallic porous body was obtained.

Example 3

A polyurethane foam having a thickness of 1.0 mm was used as the core. The foam has a continuous-pore structure with an average cell diameter of 310 μm and an average window diameter of 122 μm. A metallic porous body was obtained through the same processes as in Example 1.

Comparative Example 1

A polyurethane foam having a thickness of 1.0 mm was used as the core. The foam has a continuous-pore structure with an average cell diameter of 512 μm and an average window diameter of 71 μm. A metallic porous body was obtained through the same processes as in Example 1.

Comparative Example 2

A polyurethane foam having a thickness of 1.0 mm was used as the core. The foam has a continuous-pore structure with an average cell diameter of 327 μm and an average window diameter of 97 μm. A metallic porous body was obtained through the same processes as in Example 1.

Comparative Example 3

A polyurethane foam having a thickness of 1.0 mm was used as the core. The foam has a continuous-pore structure with an average cell diameter of 435 μm and an average window diameter of 110 μm. A metallic porous body was obtained through the same processes as in Example 1.

PROPERTY-EVALUATION METHOD

Metallic porous bodies obtained in Examples and Comparative Examples were subjected to the following tests to evaluate their properties.

Cell Diameter and Window Diameter

The cell diameters and window diameters of the metallic porous bodies obtained in Examples and Comparative Examples were determined by the measurements through micrographs taken with an SEM at 50 power. Both the cell diameters and window diameters were evaluated by the average value.

Battery Properties

The metallic porous bodies obtained in Examples and Comparative Examples were filled with a pastelike active material containing nickel hydroxide and cobalt powder with a weight ratio of 95:5. The samples were then dried and rolled so as to achieve a thickness of 0.5 mm. Positive plates were thus obtained.

The positive plate was tightly joined with an ordinary hydrogen-absorbing electrode through a separator to produce a rectangular nickel-hydrogen battery.

The battery thus obtained underwent 20 cycles of charge and discharge at 1 C rate. In this case, charging was performed up to a charging rate of 105% and discharging was performed down to a voltage of 0.8 V. The battery capacity and discharge voltage (V) were measured after this cyclic operation as the battery property. The battery capacity was obtained on the basis of the charging rate of 105% and discharge-terminating voltage of 0.8 V. The coefficient of use (%) was obtained by the ratio of the measured value of the battery capacity to the theoretical value.

Filling Quality of Active Material

The metallic porous bodies obtained in Examples and Comparative Examples were filled with the foregoing pastelike active material at a pressure of 0.005 kgf/cm$^2$ for 15 seconds to measure the weight of the filled active material. The weight of the active material thus obtained was used to determine the filled amount of the active material per cubic centimeter (g/cc) as an index of filling quality.

Air Permeability

Ten disks having a diameter of 4 cm were cut from each metallic porous body obtained in Examples and Comparative Examples. The 10 disks were stacked on top of each other so as to achieve a total thickness of 1 cm, and the pores on the periphery were closed with a silicone sealant. Air was forced to permeate the stacked disks at a speed of 0.4 m/s to measure the pressure loss (mmAq=$10^{-4}$ kgf/cm$^2$).

It is desirable to obtain a pressure loss as small as possible. Specifically, the pressure loss is required to be 20 mmAq or less.

EVALUATION OF TEST RESULTS

The test results obtained are shown in Table 2.

TABLE 2

| | Metallic porous body | | Battery property | | Filling quality (g/cc) | Air permeability (mmAq) |
|---|---|---|---|---|---|---|
| | Cell diameter (μm) | Window diameter (μm) | Coefficient of use (%)*1 | Discharge voltage (V)*2 | | |
| Example 1 | 257 | 105 | 99.9 | 1.07 | 0.95 | 15 |
| Example 2 | 253 | 104 | 97.8 | 1.06 | 0.95 | 15 |
| Example 3 | 305 | 117 | 97.6 | 1.04 | 0.97 | 7 |
| Comparative Example 1 | 500 | 71 | 96.1 | 0.93 | 0.96 | 4 |
| Comparative Example 2 | 260 | 68 | 96.0 | 0.90 | 0.83 | 36 |
| Comparative Example 3 | 324 | 93 | 96.1 | 0.91 | 0.87 | 21 |

*1: The value at 1C rate.
*2: The value measured 10 seconds after the start of the discharge at 10C rate.

As can be seen in Table 2, the comparison between Examples 1 to 3 and Comparative Example 1 shows that a decrease in cell diameter improves battery properties (coefficient of use and discharge voltage). This improvement is attributable to the fact that a reduction in the geometrical mean distance between the active material in a cell and the metallic porous body increased the current-collecting efficiency of the active material in the cell.

On the other hand, although Comparative Examples 2 and 3 have a cell diameter smaller than conventional products, their window diameter is also reduced at the same time. They showed no improvement in battery properties. This is attributable to the difficulty in filling the active material into the metallic porous body, causing uneven filling, as can be seen in the result of the filling quality of the active material.

Comparison of Comparative Example 2 with the other Comparative Examples and Examples proves that the difficulty in filling an active material is affected by the magnitude of the window diameter. In other words, as the window diameter decreases, the air permeability decreases, increasing the pressure loss.

The test results prove that a large-capacity, high-output current collector can be obtained when the average cell diameter is about 200 to about 300 μm and the average window diameter is about 100 to about 200 μm.

What is claimed is:

1. A metallic porous body comprising a metallic framework having a three-dimensional network with a continuous-pore structure formed by linking substantially polyhedral cells, wherein the substantially polyhedral cells have an average cell diameter of about 200 to about 300 µm and an average window diameter of about 100 to about 200 µm.

2. The metallic porous body according to claim 1, produced by a method comprising the steps of:

(a) providing a plastic porous body with a framework having an average cell diameter of about 200 to about 300 µm and an average window diameter of about 100 to about 200 µm;

(b) forming a conductive layer on a surface of the framework of the plastic porous body by electroless plating to produce a conductive porous body having a resistivity of about 1 kΩ·cm or less; and (c) forming a continuous metal-plated layer on a surface of the conductive layer by electroplating, with the conductive porous body serving as the cathode.

3. The metallic porous body according to claim 2, wherein the conductive layer comprises nickel.

4. A metallic porous body according to claim 2, wherein the plastic porous body is removed by heat treatment after the metal-plated layer is formed.

5. The metallic porous body according to claim 1, produced by a process comprising the steps of:

(a) providing a plastic porous body with a framework having an average cell diameter of about 200 to about 300 µm and an average window diameter of about 100 to about 200 µm;

(b) forming a conductive layer on a surface of the framework of the plastic porous body by applying a solution of binder resin containing a carbon powder to produce a conductive porous body having a resistivity of about 5 kΩ·cm or less; and (c) forming a continuous metal-plated layer on a surface of the conductive layer by electroplating, with the conductive porous body serving as the cathode.

6. A method of manufacturing the metallic porous body according to claim 1, the method comprising the steps of:

(a) providing a plastic porous body with a framework having an average cell diameter of about 200 to about 300 µm and an average window diameter of about 100 to about 200 µm;

(b) forming a conductive layer on a surface of the framework of the plastic porous body by electroless plating to produce a conductive porous body having a resistivity of about 1 kΩ·cm or less; and (c) forming a continuous metal-plated layer on a surface of the conductive layer by electroplating, with the conductive porous body serving as the cathode.

7. A method of manufacturing the metallic porous body according to claim 1, the method comprising the steps of:

(a) providing a plastic porous body with a framework having an average cell diameter of about 200 to about 300 µm and an average window diameter of about 100 to about 200 µm;

(b) forming a conductive layer on a surface of the framework of the plastic porous body by applying a solution of binder resin containing a carbon powder to produce a conductive porous body having a resistivity of about 5 kΩ·cm or less; and (c) forming a continuous metal-plated layer on a surface of the conductive layer by electroplating, with the conductive porous body serving as the cathode.

8. A battery comprising current collector having a metallic porous body according to claim 1.

9. A metallic porous body comprising a metallic framework having a three-dimensional network with a continuous-pore structure formed by linking substantially polyhedral cells, wherein the substantially polyhedral cells have an average cell diameter of about 250 to about 350 µm and an average window diameter of about 100 to about 200 µm.

* * * * *